March 20, 1962     J. F. HUTTO     3,026,254
PURIFICATION OF FURFURAL
Filed Sept. 8, 1959
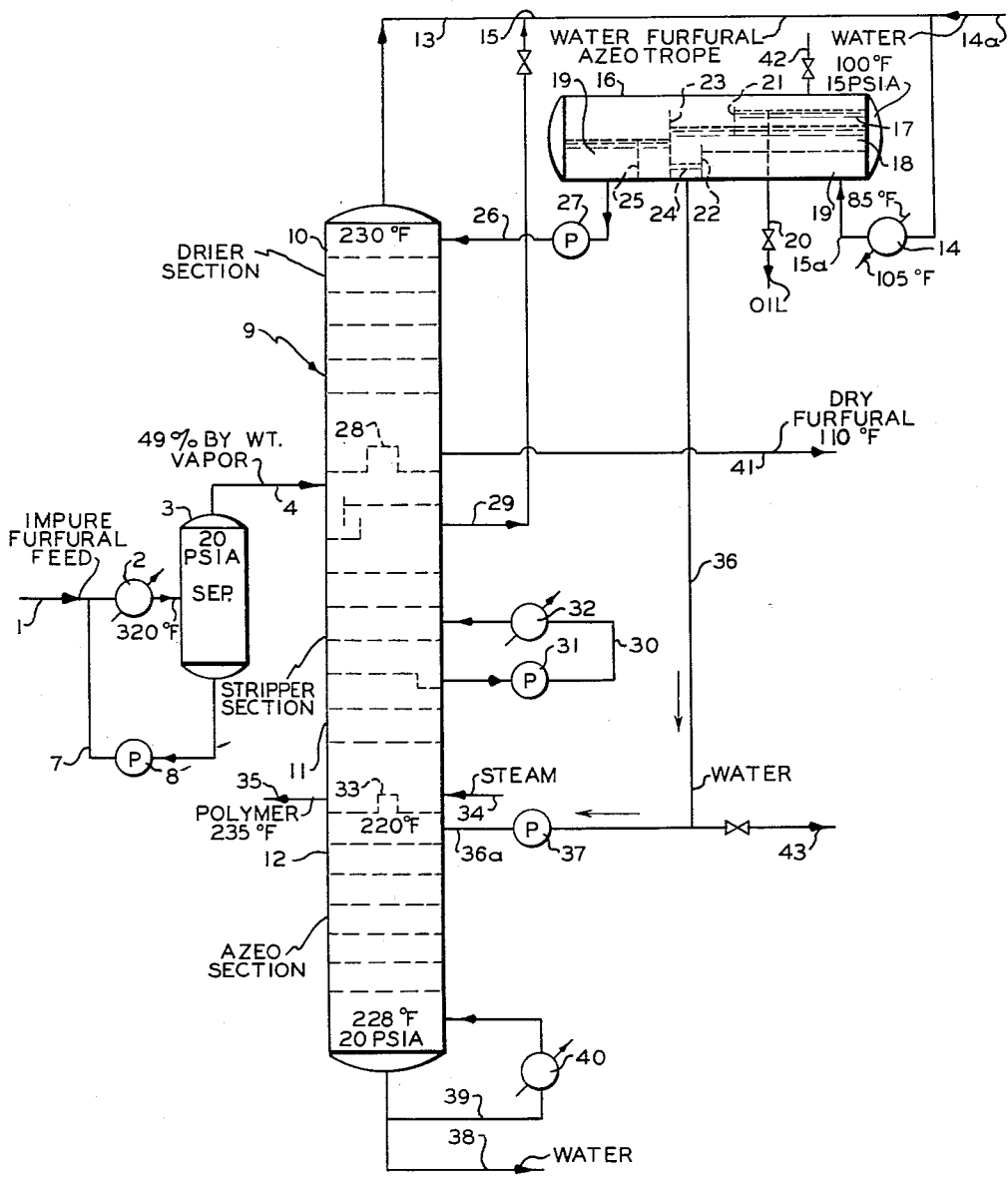
INVENTOR.
J. F. HUTTO
BY *Hudson & Young*
ATTORNEYS

United States Patent Office 3,026,254
Patented Mar. 20, 1962

3,026,254
PURIFICATION OF FURFURAL
John F. Hutto, Bartlesville, Okla., assignor to Phillips Petroleum Company, a corporation of Delaware
Filed Sept. 8, 1959, Ser. No. 838,739
7 Claims. (Cl. 202—42)

This invention relates to apparatus and method for furfural purification. In one aspect it relates to apparatus and method for the treatment of furfural which has been employed as a selective solvent in the extraction and concentration of unsaturated hydrocarbons and hydrocarbon streams containing the same, especially of aliphatic mono-olefins and aliphatic, conjugated diolefins, particularly butylenes and butadienes, from respective process streams containing these, whereby the furfural has become contaminated with polymer. This polymer consists largely of furfural polymer. Apparently its formation takes place under the influence of heat, pressure, moisture, hydrocarbons, especially olefins and diolefins, air or oxygen, and other conditions and in the presence of other components encountered in the absorption and stripping zones. The concentration of this polymer in the furfural continually increases with time of use until finally it becomes so high that it is necessary to close down the plant for cleaning or withdrawal and discard of the furfural. Accumulation of this polymer is objectionable for a number of reasons. In addition to diluting the furfural by the presence of soluble polymer, polymer precipitates and solidifies and coats the surfaces of the equipment thereby interfering with heat transfer. Upon continued use of the equipment containing a coating of solid polymer, coking, especially on the heating coils, and deposition of polymers in the valves occur.

A principal object of the present invention is to provide apparatus and a method for treating solvent furfural contaminated with polymer in order to remove the polymer and recover pure furfural for recycle in an extractive distillation system. Still another object is to provide apparatus and a process for the continuous purification of solvent furfural containing furfural polymer. Other objects and advantages will be realized upon reading the following description which, taken with the attached drawing, forms a part of this specification.

In the drawing, the FIGURE illustrates diagrammatically, and partly in section, one arrangement of apparatus parts suitable for carrying out the process of this invention.

In the drawing, an impure feed furfural containing such impurities as oil resulting from the previous use of the furfural in the extraction of unsaturated hydrocarbon, water, furfural polymer and other impurities is introduced into the system through a pipe 1. Since this feed material undergoes fractionation, it is preheated in a heat exchanger 2. The preheated feed passes into a separator vessel 3. Liquid from the bottom of this separator is passed by pump 8 through a pipe 7 into pipe 1 upstream of the heater 2. A mixture of vapor and liquid is passed from the top of separator 3 through a pipe 4 into a tower or treating vessel 9. The purpose of the separator vessel 3 is to permit recycle of only liquid to the preheater so that approximately half of the feed to the tower 9 is vapor. Thus, the feed entering vessel 9 through pipe 4 is approximately half vapor and half liquid, by weight. This vapor and liquid feed is introduced into the tower just below a do-nut tray 28. Liquid flows downward from the level of feed introduction and, in general, vapor passes upward through the do-nut tray. This entire tower 9 comprises three process sections, the upper section 10 being a drier section, the middle section 11 being a stripper section and the bottom section 12 being an azeotropic distillation section. Each of these three sections is provided with suitable vapor liquid contact-promoting equipment such as bubble cap trays.

Liquid feed entering stripper section 11 flows, in general, downward and is contacted by upflowing vapor from the azeotropic distillation section 12 entering stripper section 11 through a do-nut tray 33. Steam to improve the effectiveness of the stripping in section 11 is introduced through a pipe 34, as illustrated. An intermediate heating apparatus is provided in conjunction with stripper section 11. This auxiliary heating apparatus comprises a conduit 30, provided with a pump 31 and a heater 32. As illustrated in the drawing, conduit 30 reintroduces heated liquid onto a tray at least one tray above its point of withdrawal. Obviously, not all of the liquid flowing downward through the stripper section is passed through the reheater 32. In this stripper section, it is intended that all volatile materials, such as oil, water and furfural, be distilled and pass upward through the do-nut tray 28 while substantially only polymer reaches the do-nut tray 33. Thus, polymer substantially free from other materials, particularly furfural, is removed from the stripper section 11 though a pipe 35.

Vapor entering the drier section 9 through do-nut tray 28 passes upward in this section and overhead vapors are withdrawn through an overhead pipe 13 and pass on through a pipe 15, condenser 14, with condensate passing through pipe 15a into an accumulator or phase separator vessel 16. Furfural, saturated with water, is pumped by a pump 27 through a pipe 26 into the top of the drier section 10 for reflux purposes. With this refluxing with furfural containing only water in solution, relatively dry furfural is produced and withdrawn from the bottom of drier section 10 through a pipe 41 for passage to a run storage tank or directly to the above-mentioned extraction operation, not shown. This furfural withdrawn through pipe 41, while herein termed dry furfural, does contain a small percent of water. For use in the above-mentioned extractive distillation operation, strictly dry or anhydrous furfural is not necessary and this present operation produces furfural sufficiently dry therefor.

In the accumulator or phase separation tank 16, several liquid phases are separated from one another. The condensate containing these several liquid phases enters the tank through pipe 15a and furfural, being specifically heavier than water, settles as the lower liquid phase. The first separation of the phases occurs reasonably close to the point of entry of the condensate into this tank and the furfural phase is identified by reference numeral 19. This heavier furfural phase then passes through a conduit 24 leading from the righ-hand side of a baffle 22 to the left-hand side of a higher baffle 23. This furfural then flows over a low baffle 25 into the left-hand compartment of the accumulator for withdrawal through pipe 26 as reflux.

Floating on top of the furfural phase 19 is a water layer 18 and this water layer flows over the top of baffle 22 and is withdrawn from the accumulator through a pipe 36 for use or disposal as subsequently mentioned. Floating on top of the water layer is an oil layer 17 which is maintained in the right-hand end of the accumulator vessel by positioning of a baffle 21, as illustrated. This oil phase is withdrawn through a pipe 20 which extends upward through the bottom of vessel 16 and through the furfural and water layers and to such a height thereabove as desired to maintain the level of the oil phase. Thus, oil from this operation is removed through this valved pipe 20 as desired. A valve pipe 42 is provided in the top of the vessel for pressure relief when necessary.

The water is present in accumulator 16 because the feed furfural introduced to the column contains water and steam is introduced into the lower portion of the stripper section 11. Thus, water from these several sources is condensed in condenser 14. Since furfural is soluble in water to the extent of several percent, the water phase from the accumulator is passed through pipe 36 by pump 37 and through pipe 36a into the azeotropic distillation section 12. This water containing soluble furfural is returned to the main column to recover the furfural which would be lost in case this water phase were removed from the system. However, since a minor amount of other impurities is dissolved in the water, a small portion of this condensate water is removed through a pipe 43 to prevent build-up of these impurities. The loss of furfural in this withdrawn water is not large.

In the azeotropic distillation section 12 of the column, all furfural introduced by way of pipe 36a is intended to be distilled as an azeotropic mixture of furfural and water. This azeotropic mixture is passed upward through do-nut tray 33 into the stripper section 11, as hereinbefore mentioned. A pipe 38 communicates with the bottom of azeotropic section 12 for withdrawal of the water free from furfural. Reboiling heat is added to this distillation section by passage of a portion of the water from pipe 38 through pipe 39, heater 40 and return to the tower.

In case there is not sufficient water condensed in condenser 14 for separation of an oil phase 17 in accumulator 16, additional water is added upstream of the condenser through a pipe 14a. Thus, by addition of this extra water when required, precipitation or separation of the soluble oils from the furfural is assured to prevent build-up of these oils in this purification system.

As an example of the operation of this process, the following illustrative operating conditions are given. Heater 2 heats the feed stock to a temperature of about 320° F. and this temperature is ordinarily sufficient to vaporize approximately 49 percent by weight of the feed stock. The drier section overhead temperature is approximately 230° F. and such temperature is maintained by use of about 85° F. cooling water for condenser 14. Water emerges from this condenser at about 105° F. and is returned to the plant cooling tower, not shown. The condensate is produced in condenser 14 at a temperature of about 100° F. and that temperature is maintained in accumulator 16. The accumulator pressure is about 15 p.s.i.a. (pounds per square inch absolute).

The water phase containing furfural in solution is introduced into the azeotropic distillation section at a temperature of about 100° F. and this cool feed, in cooperation with heater 40, permits maintenance of a temperature of about 220° F. on the upper tray or at the vapor outlet of azeotropic distillation section 12. The steam introduced through pipe 34 is superheated steam and this steam finishes stripping of the polymer which is withdrawn from the tower through pipe 35 at a temperature of about 235° F. Heater 40 maintains a temperature of about 228° F. in the kettle section of the azeo still 12. Pressure at this point is about 20 p.s.i.a. Purified furfural is withdrawn through pipe 41 from the bottom of the drier section 10 at a temperature of about 110° F. A pressure of about 20 p.s.i.a. is maintained in the separator vessel 3.

The following tabulation gives a material balance in pounds per hour of material treated according to the process of this invention in the apparatus illustrated in the figure.

Furfural vapor, rich in steam, is withdrawn from the upper portion of the stripping zone, passed through line 29 and combined with the overhead vapors from the drying zone 9.

Materials of construction can be selected from among those commercially available, taking into consideration corrosion caused by any of the process streams.

Valves, pressure and temperature control apparatus are not illustrated in the drawing nor described in the disclosure for purposes of simplicity and brevity. The need, installation, use and care of such equipment is well understood by those skilled in the art.

While certain embodiments of the invention have been described for illustrative purposes, the invention obviously is not limited thereto.

I claim:
1. A method for purifying a feed stream of furfural containing also furfural polymer, water and soluble oils comprising introducing said stream into a stripping zone and therein stripping said furfural, water and soluble oils as vapor from said polymer, withdrawing this latter polymer as one product, passing the stripping vapor into a drying zone and refluxing said drying zone with furfural as subsequently produced, withdrawing overhead vapors from said drying zone, condensing the withdrawn vapors thereby producing an oil phase, a furfural phase and a water phase containing furfural in solution, withdrawing the oil phase as a second product, said furfural phase being said furfural as subsequently produced, withdrawing furfural from the lower portion of said drying zone as a third and main product, introducing said water phase containing furfural in solution into a distillation zone and therein distilling a vaporous azeotropic mixture of furfural and water therefrom, withdrawing the excess water over that required to form said azeotropic mixture from said distillation zone as a fourth product and passing said vaporous azeotropic mixture into said stripping zone as a stripping medium.

2. In the method of claim 1, withdrawing vapors from an upper portion of said stripping zone and combining with the overhead vapors from said drying zone.

3. In the method of claim 1, introducing stripping steam into said stripping zone as an additional stripping medium.

4. In the method of claim 1, withdrawing liquid reflux from an intermediate section of said stripping zone, heating this withdrawn liquid reflux and returning the heated reflux to said stripping zone at a level above the level of its withdrawal.

5. In the method of claim 1, vaporizing about half the feed stream of furfural and introducing the vaporized and unvaporized portions of said feed stream into the stripping zone as feed thereto.

6. An apparatus comprising, in combination, a vertically positioned vessel, a first do-nut tray disposed across said vessel at a level nearer the top than the bottom but at a spaced distance from the top, a second do-nut tray disposed across said vessel at a level nearer the bottom than the top but at a spaced distance from the bottom, a vapor outlet in the top of said vessel, a condenser in communication with said vapor outlet, a separator vessel in communication with said condenser, means for transferring liquid from said separator vessel to the top of said vessel, means for withdrawal of liquid from a level intermediate

*Material Balance in Pounds per Hour*

| Stream No. | 1 | 41 | 13 | 29 | 34 | 35 | 26 | 43 | 36a | 38 |
|---|---|---|---|---|---|---|---|---|---|---|
| Component: | | | | | | | | | | |
| Water | 313 | 59 | 529 | 2,988 | 1,000 | 65 | 293 | 254 | 2,970 | 935 |
| Furfural | 7,490 | 7,456 | 846 | 4,236 | | | 4,762 | 25 | 295 | 9 |
| Polymer | 32 | 3 | | | | 29 | | | | |
| Total | 7,835 | 7,518 | 1,375 | 7,224 | 1,000 | 94 | 5,055 | 279 | 3,265 | 944 |
| Gallons per hour, 60° F | 811 | 775 | | | | 11 | | 33 | 387 | 113 |
| M s.c.f. per hour | | | 14.5 | 79.1 | 21 | | | | | | the do-nut trays and return to a level intermediate said do-nut trays but above its level of withdrawal, said means including a heater, a reboiler in communication with the bottom of said vessel, a conduit for passage of liquid from said separator to the section of said vessel below said second do-nut tray, separate means for withdrawing product liquids from said first do-nut tray, from said second do-nut tray and from the bottom of said vessel, and an inlet for adding feed to said vertically positioned vessel at a level below but near said first do-nut tray.

7. In the apparatus of claim 6, a conduit leading from a source of liquid to be introduced into said vessel, a heater in said conduit, a second separator vessel, said conduit communicating operatively with said second separator vessel, a conduit leading from the lower portion of said second separator vessel to said conduit intermediate said source and said heater, a pump in this latter conduit, and a conduit leading from the upper portion of said second separator vessel to said inlet.

References Cited in the file of this patent

UNITED STATES PATENTS

| | | |
|---|---|---|
| 2,081,884 | Roberts | May 25, 1937 |
| 2,167,730 | Smoley | Aug. 1, 1939 |
| 2,350,584 | Buell et al. | June 6, 1944 |
| 2,350,609 | Hachmuth | June 6, 1944 |
| 2,405,393 | Atkins | Aug. 6, 1946 |
| 2,442,474 | Scarth | June 1, 1948 |
| 2,514,967 | Pierotti | July 11, 1950 |
| 2,593,931 | Stearns | Apr. 22, 1952 |